Feb. 21, 1928.
H. M. LINDING
FLY CATCHER
Filed Sept. 27, 1926
1,660,011
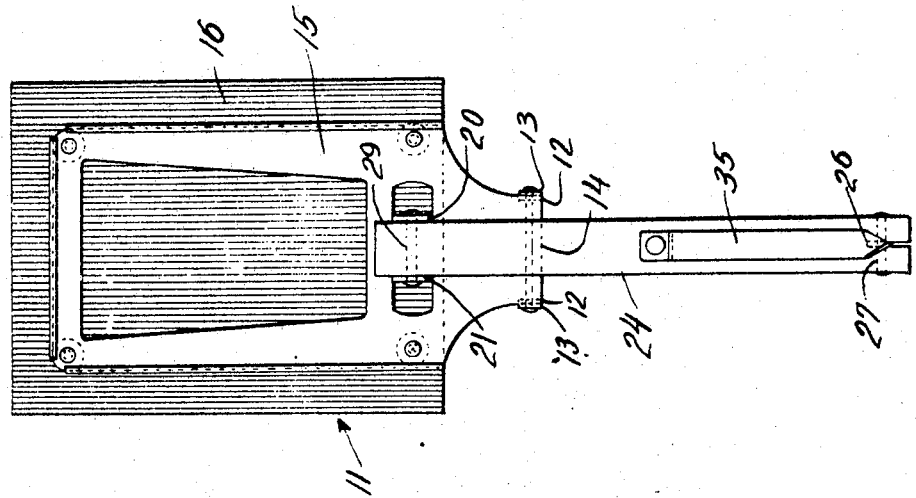
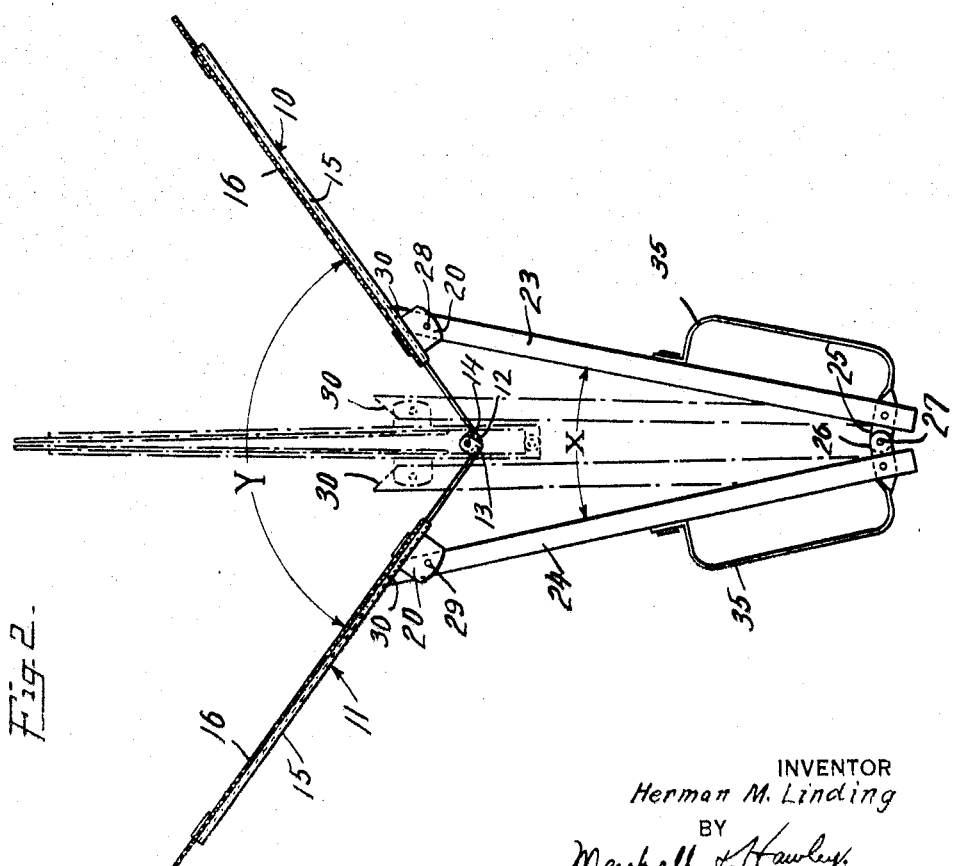
INVENTOR
Herman M. Linding
BY
Marshall Hawley.
ATTORNEYS Patented Feb. 21, 1928.

1,660,011

UNITED STATES PATENT OFFICE.

HERMAN M. LINDING, OF OSSINING, NEW YORK.

FLYCATCHER.

Application filed September 27, 1926. Serial No. 137,838.

This invention relates to a device for catching or swatting flies or other winged insects.

It is a comparatively simple matter to kill flies or similar insects when they light and remain inactive long enough to permit striking or swatting them with the ordinary type of fly swatter. However, the element of time is controlling and if they take wing all efforts with the ordinary fly swatter are futile and the fly or insect escapes.

This invention has for its salient object to provide a device of the character specified so constructed that it renders possible the catching and killing of flies or insects on the wing.

Another object of the invention is to provide a device of the character specified capable of high speed manipulation.

Another object of the invention is to provide a device of the character described that is simple in construction, effective in operation, and economical to manufacture.

Further objects of the invention will appear from the following specification taken in connection with the drawings, which form a part of this application, and in which Fig. 1 is a plan view of the device constructed in accordance with the invention; and Fig. 2 is a side elevation of the structure shown in Fig. 1, the device being shown in full lines in open position and in dotted lines in closed position.

The invention briefly described comprises a pair of pivoted members having flat surfaces adapted to engage and crush the fly or insect, and a pair of members or levers pivoted to each other and to the first named pivoted members in such a manner that a relatively small movement of the levers will cause a relatively large movement of the pivoted members. Further details of the invention will appear from the following description.

In the embodiment of the invention illustrated, the device comprises a pair of substantially flat members 10 and 11 having lugs 12 and 13 at their ends mounted on a pivot 14.

The members 10 and 11 may be of any desired form or construction, but in the device illustrated each of these members consists of a frame 15, preferably of sheet metal, having a wire screen 16 secured thereto. Each of the frames has struck out from the back thereof a pair of lugs 20 and 21.

The hinged members 10 and 11 are manipulated by means of a pair of levers or handles 23 and 24 having lugs 25 and 26 pivotally connected at 27. The lever or handle 23 is pivoted at 28 to the lugs 20 and 21 formed on the frame of the member 10, and the lever 24 is pivoted at 29 to the lugs 20 and 21 formed on the frame of the member 11. The ends of the levers 23 and 24 are shown as beveled at 30 to form stops to limit the opening movement of the members 10 and 11.

To facilitate opening or spreading the handle or levers 23 and 24, strips or loops 35 are secured thereto.

From the illustration in Fig. 2 it will be seen that the pivots 28 and 29 are spaced from the pivot 14 of the members 10 and 11, and further, that the levers 23 and 24 are pivoted to each other a considerable distance from the pivot 14 and are relatively long. For these reasons a comparatively small angle of movement of the levers indicated at X in Fig. 2 will cause a relatively large angle of movement on the pivoted members 10 and 11 as shown at Y in Fig. 2. Because of the leverage obtained the device can be operated at high speed, thus cutting down the chances of the fly or insect escaping. Furthermore, the comparatively small movement of the handles or levers 23 and 24 requires very little effort on the part of the user. Also, by the use of this device, flies and insects can be easily killed without disfiguring walls, ceilings, furniture or other articles, since the fly is caught between the hinged members of the device.

Although one specific embodiment of the invention has been particularly shown and described, it will be understood that the invention is capable of modification and that changes in the construction and in the arrangement of the various cooperating parts may be made without departing from the spirit or scope of the invention.

What I claim is:

1. A fly catcher comprising a pair of pivoted members pivoted to each other at one end and operating means for said members, said operating means comprising a pair of elongated members pivotally connected to said pivoted members at points intermediate their pivotal connection and their outer edges, the pivotal connection between the pivoted members, and pivoted to each other at a point spaced on the opposite side of the pivot of the pivoted members.

2. A fly catcher comprising a pair of flat members pivoted to each other at one end thereof, each member having lugs extending laterally therefrom, a bar pivoted between the lugs of each member and a pivotal connection between said bars.

3. A fly catcher comprising a pair of pivoted members, pivoted operating means for said members, and means on said operating means for limiting the movement of said pivoted members in one direction about their pivot.

4. A fly catcher comprising a pair of flat members pivoted to each other at one end thereof, a lever pivoted to the outer face of each of said members, said levers being pivoted to each other, and a loop secured to each lever to facilitate the movement thereof.

5. A fly catcher comprising a pair of flat members pivoted to each other at one end thereof, a lever with one of its ends pivoted to the outer face of each of said members intermediate the pivotal connection between the members and their outer edges, the other end of said levers being pivoted together whereby relative movement of the levers is imparted to the members at an increased rate.

In witness whereof, I have hereunto set my hand this 23rd day of September, 1926.

HERMAN M. LINDING.